(12) United States Patent
Cooper

(10) Patent No.: US 8,920,245 B2
(45) Date of Patent: *Dec. 30, 2014

(54) VIDEO GAME TITLE PROFILE AWARDS

(71) Applicant: Microsoft Corporation, Redmond, WA (US)

(72) Inventor: Ryan B. Cooper, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,297

(22) Filed: Dec. 12, 2013

(65) Prior Publication Data

US 2014/0100041 A1    Apr. 10, 2014

Related U.S. Application Data

(63) Continuation of application No. 12/023,391, filed on Jan. 31, 2008, now Pat. No. 8,632,412.

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *A63F 13/30* | (2014.01) | |

(52) U.S. Cl.
CPC ......... *A63F 13/12* (2013.01); *A63F 2300/5546* (2013.01); *A63F 2300/609* (2013.01)
USPC .................. 463/43; 463/30; 463/31; 463/42; 463/47; 463/49

(58) Field of Classification Search
USPC .............................. 463/20, 25, 30, 31, 43, 47
See application file for complete search history.

(56) References Cited

U.S. PATENT DOCUMENTS 7,192,349 B2    3/2007    Baerlocher
7,192,351 B2    3/2007    Rozkin (Continued)

FOREIGN PATENT DOCUMENTS

WO    WO 2006/004831    1/2006

OTHER PUBLICATIONS

Digital Chocolate Launches DChoc Cafe Series into Mobile Social Networking market, 2007 Nokia Corporation, http://www.nokia.com, 2 pages.

(Continued)

*Primary Examiner* — Adetokunbo O Torimiro
(74) *Attorney, Agent, or Firm* — Bryan Webster; Kate Drakos; Micky Minhas

(57) ABSTRACT

Techniques for recognizing the accomplishments of a game player are disclosed herein. In particular, a user identification profile is provided so that digital items awarded to the user for meeting specified performance criteria in a video game or some other event may be associated with such user identification profile. The digital item may be something that is usable within the current video game title, in a later version or the next generation of a particular video game title, or even in a different video game by the same developer. One technique involves receiving an identification representative of the digital item awarded to the user, associating the digital item with the user identification profile corresponding to the user, and storing an indication that the digital item is associated with the user identification profile. In this way, the indication may be utilized to display the digital item in the user identification profile.

20 Claims, 4 Drawing Sheets

(56) References Cited

U.S. PATENT DOCUMENTS

| | | |
|---|---|---|
| 7,278,919 B2 | 10/2007 | Souza |
| 2001/0034635 A1 | 10/2001 | Winters |
| 2002/0198054 A1 | 12/2002 | Auxier |
| 2005/0054439 A1 | 3/2005 | Rowe |
| 2005/0131761 A1 | 6/2005 | Trika |
| 2005/0181866 A1 | 8/2005 | Baerlocher |
| 2005/0240476 A1 | 10/2005 | Bigott |
| 2006/0084509 A1 | 4/2006 | Novak |
| 2006/0121991 A1 | 6/2006 | Borinik |
| 2006/0154727 A1 | 7/2006 | Okuniewicz |
| 2006/0160620 A1 | 7/2006 | Matthews |
| 2006/0247012 A1 | 11/2006 | Walker |
| 2007/0093299 A1 | 4/2007 | Bergeron |
| 2007/0218979 A1 | 9/2007 | Momoda |
| 2008/0161113 A1 | 7/2008 | Hansen |

OTHER PUBLICATIONS

Eclipitical Realms Online Gaming Statistical Community, Downloaded from Internet Nov. 2, 2007, http://www.eclipticalrealms.com/memberplus.asp, 2 pages.

International Search Report, mailed Aug. 6, 2009, Application No. PCT/US2008/088448, filed Dec. 29, 2008, 11 pages.

Office Action dated Feb. 4, 2010, U.S. Appl. No. 12/023,391.

Response to Office Action dated Apr. 18, 2011, U.S. Appl. No. 12/023,391.

Office Action dated Jul. 12, 2010, U.S. Appl. No. 12/023,391.

Response to Office Action dated Oct. 4, 2011, U.S. Appl. No. 12/023,391.

Notice of Allowance dated Sep. 30, 2013, U.S. Appl. No. 12/023,391.

VIDEO GAME TITLE PROFILE AWARDS

This application is a continuation application of U.S. patent application Ser. No. 12/023,391, "Video Game Title Profile Awards," filed on Jan. 31, 2008, by Cooper, incorporated herein by reference in its entirety.

BACKGROUND

Conventional video game systems provide users with a wide selection of games employing highly sophisticated technology, digital effects, and other features. Video game players often invest a great deal of time and effort in learning how to play and master these video games. Thus, winning or advancing to a new skill level in a video game is often a difficult process for players. Thus, to satisfy players for investing their time and effort, it is desirable to recognize that players have reached an accomplished within a game. Such recognition encourages players and enhances their overall entertainment experience. In conventional video game systems, however, such recognition is typically limited to increasing the player's score or providing a listing of the player's accomplishments. Unfortunately, in conventional gaming systems, players do not receive actual rewards or items in return for their accomplishments.

SUMMARY

Techniques for recognizing the accomplishments of a game player are disclosed herein. In particular, a user identification profile is provided so that digital items awarded to the user for meeting specified performance criteria in a video game may be associated with such user identification profile. Alternatively, the digital award may be based on something entirely outside of the gaming arena, such as attendance at a designated event (e.g., a concert, tournament, or sporting event) or the accumulation of loyalty points granted by a designated sponsor. It will further be appreciated that the digital item may be something that is usable within the current video game title, in a later version or the next generation of a particular video game title, or even in a different video game by the same developer. In order to enhance the display of the digital item, an avatar and/or digital closet may be provided within the user identification profile which is able to wear the digital item.

In order to provide the digital item to a user so that it is transferable, the process may involve receiving an identification representative of the digital item awarded to the user, associating the digital item with the user identification profile corresponding to the user, and storing an indication that the digital item is associated with the user identification profile. The identification may include, for example, the actual item received in game or a notification in game that the item will be received. In this way, the indication may be utilized to display the digital item in the user identification profile. It will further be seen that displaying the digital item may involve receiving a request to display a user identification profile, retrieving the user profile information corresponding to the user, and displaying the digital profile information.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
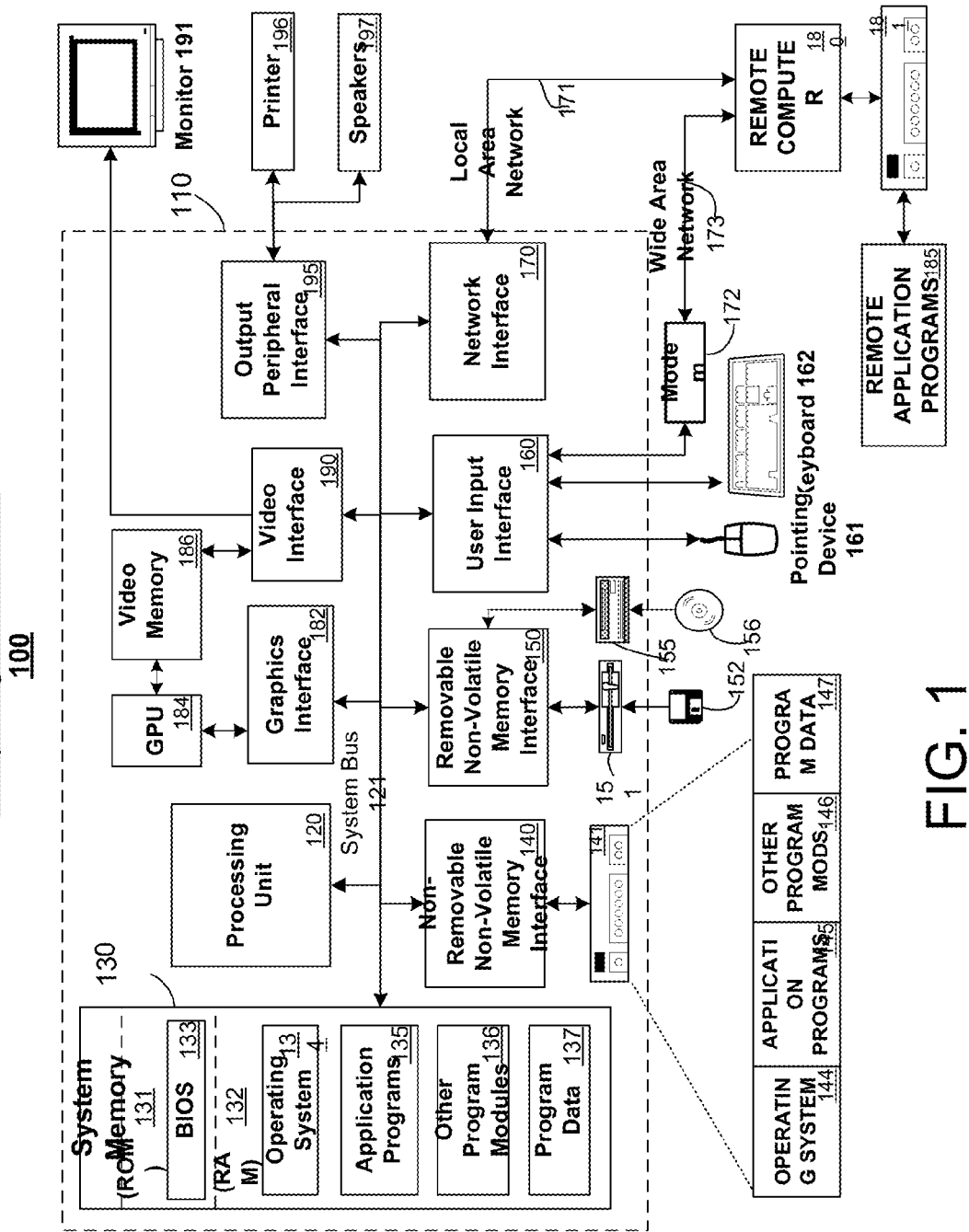
FIG. 1 is a block diagram an exemplary computing device.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 3:
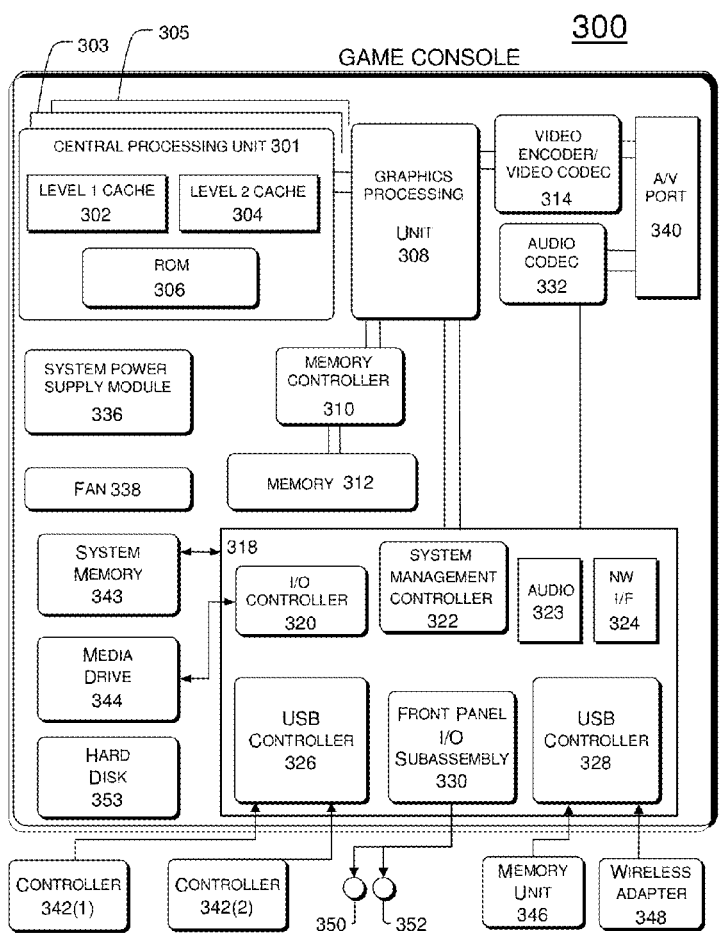
FIG. 3 is a depiction of a suitable computing environment in which accomplishments of a video game player and a user identification can be implemented; and, FIG. 4 is a flow diagram of an exemplary process for displaying a digital profile of a user and any items awarded thereto.

It will be appreciated that one particular application of computer 110 is in the form of a game console 300 (FIG. 3). As seen therein, game console 300 has a central processing unit (CPU) 301 having a level 1 (L1) cache 302, a level 2 (L2) cache 304, and a flash ROM (Read-only Memory) 306. The level 1 cache 302 and level 2 cache 304 temporarily store data and hence reduce the number of memory access cycles, thereby improving processing speed and throughput. The flash ROM 306 can store executable code that is loaded during an initial phase of a boot process when the game console 300 is initially powered. Alternatively, the executable code that is loaded during the initial boot phase can be stored in a FLASH memory device (not shown). Further, ROM 306 can be located separate from CPU 301. Game console 300 can, optionally, be a multi-processor system; for example, game console 300 can have three processors 301, 303, and 305, where processors 303 and 305 have similar or identical components to processor 301.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display device. A controller 310 is connected to the GPU 308 and CPU 301 to facilitate processor access to various types of memory 312, such as, but not limited to, a RAM (Random Access Memory).

Game console 300 includes an I/O controller 320, a system management controller 322, an audio processing unit 323, a network interface controller 324, a first USB host controller 326, a second USB controller 328 and a front panel I/O subassembly 330 that may be implemented on a module 318. The USB controllers 326 and 328 serve as hosts for peripheral controllers 342(1)-842(2), a wireless adapter 348, and an external memory unit 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless interface components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the game console 300. When media drive 344 is a drive or reader for removable media (such as removable optical disks, or flash cartridges), then media drive 344 is an example of an interface onto which (or into which) media are mountable for reading. Application data may be accessed via the media drive 344 for execution, playback, etc. by game console 300. Media drive 344 is connected to the I/O controller 320 via a bus, such as a Serial ATA bus or other high speed connection (e.g., IEEE 3394). While media drive 344 may generally refer to various storage embodiments (e.g., hard disk, removable optical disk drive, etc.), game console 300 may specifically include a hard disk 353, which can be used to store game data, application data, or other types of data, and on which the file systems depicted in FIGS. 3 and 4 may be implemented.

The system management controller 322 provides a variety of service functions related to assuring availability of the game console 300. The audio processing unit 323 and an audio codec 332 form a corresponding audio processing pipeline with high fidelity, 3D, surround, and stereo audio processing according to aspects of the present subject matter described herein. Audio data is carried between the audio processing unit 323 and the audio codec 326 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the game console 300. A system power supply module 336 provides power to the components of the game console 300. A fan 338 cools the circuitry within the game console 300.

The CPU 301, GPU 308, memory controller 310, and various other components within the game console 300 are interconnected via one or more buses, including serial and parallel buses, a memory bus, a peripheral bus, and a processor or local bus using any of a variety of bus architectures.

When the game console 300 is powered on or rebooted, application data can be loaded from the system memory 343 into memory 312 and/or caches 302, 304 and executed on the CPU 301. The application can present a graphical user interface that provides a consistent user experience when navigating to different media types available on the game console 300. In operation, applications and/or other media contained within the media drive 344 may be launched or played from the media drive 344 to provide additional functionalities to the game console 300.

The game console 300 may be operated as a standalone system by simply connecting the system to a television or other display. In this standalone mode, the game console 300 may allow one or more users to interact with the system, watch movies, listen to music, and the like. However, with the integration of broadband connectivity made available through the network interface 324 or the wireless adapter 348, the game console 300 may further be operated as a participant in a larger network community.

A gamer profile, also known as a user profile or user identification herein, may be stored within game console 300, such as in hard disk 353, or at any other suitable location on or accessible to game console 300. This user identification may include general information, such as the user's name or gamertag, biography, geographical location, and the like. In addition, other pertinent information relating to the user's gamerscore, reputation, and gamer zone may also be stored in the user identification. Various achievements accomplished by the user may also be stored within the user identification.

It will be understood that a gamer is preferably able to be recognized as having achieved or accomplished various items offered up by the game's developer. Such achievements may include, for example: finishing the game; earning a 100% rating for finding all secrets and items; beating a level or the entire game within a set time limit; beating a player online ranked several levels higher; competing with or against someone from a different country; beating all the preset high scores; or, finishing a level in a stealth game without ever being spotted. Recognition for such achievements has heretofore been limited since it may persist in the user profile but is not transferable to another experience.

Figure 2:
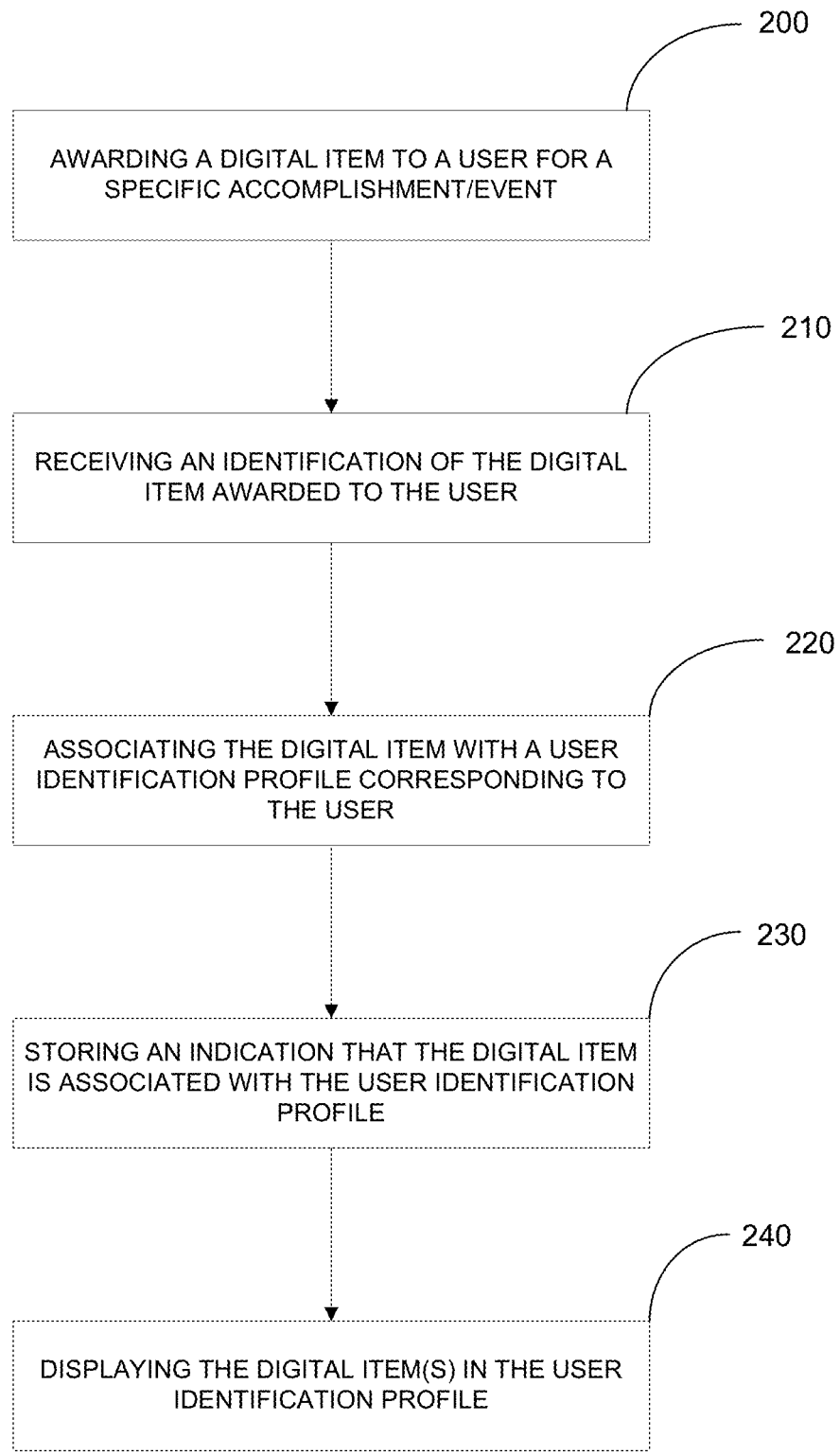
FIG. 2 is a flow diagram of an exemplary process for associating accomplishments of a video game player with a user identification for display.

In order to reward users for continued investment in a game, a process is preferably performed by computer-executable instructions stored within game console 300. More specifically, as seen in FIG. 2, an exemplary process includes the step of awarding a digital item to a user for a specific accomplishment in a video game (box 200). The specific accomplishment may relate to meeting certain criteria performance set forth by a game developer, as indicated above, and the digital item may be automatically awarded to the user upon the occurrence of such accomplishment. In addition, the digital award may be based on something entirely outside of the gaming arena, such as attendance at a designated event (e.g., a concert, tournament, or sporting event) or the accumulation of loyalty points granted by a designated sponsor.

It will further be appreciated that the digital item may be something that is usable within the current video game title, in a later version or the next generation of a particular video game title, or even in a different video game by the same developer. The digital item may, for example, unlock a level in another game or provide access to certain advanced or desirable equipment, weapons, or the like. In another embodiment, the digital item may be an article of clothing (e.g., a football jersey for Madden NFL, a basketball jersey for NBA Live, armor, a helmet, etc.). In order to enhance the display of the digital item, an avatar and/or digital closet may be provided within the user identification which is able to wear the digital item.

According to the process, an identification representative of the digital item awarded to the user is received (box 210). The digital item is then associated with the user identification corresponding to the user (box 220). Upon completion of such association, an indication that the digital item is associated with the user identification is stored (box 230). This indication may be utilized to permit displaying of the digital item in the user profile (box 240).

Figure 4:
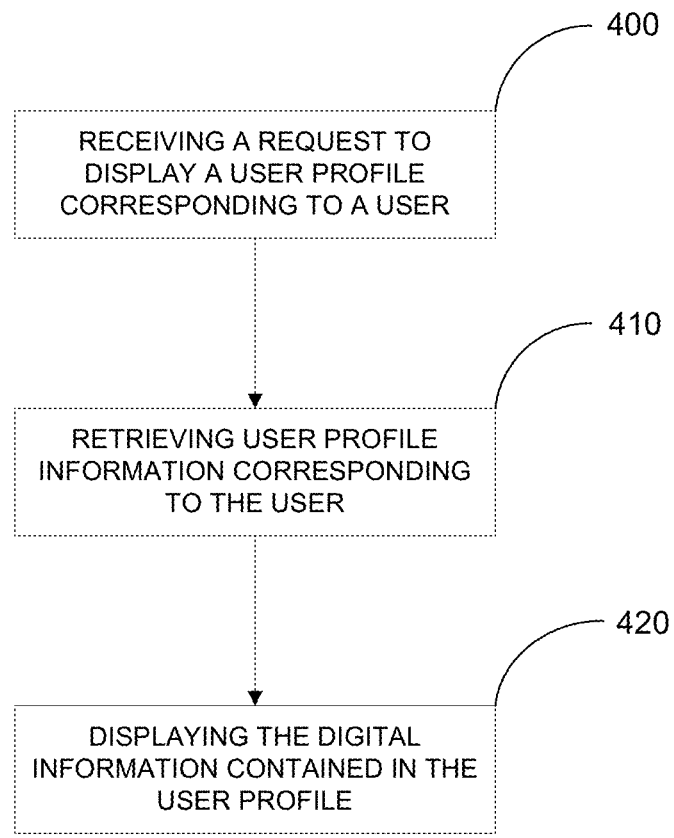

Another process performed by computer-executable instructions stored within a computer-readable medium (e.g., gaming console 300) involves the display of the user identification or profile. As seen in FIG. 4, an exemplary process first involves receiving a request to display the user profile corresponding to a first or specified user (box 400). Upon receipt of such request, user profile information corresponding to the first user is retrieved from memory (box 410). It will be appreciated that the user profile preferably includes at least one digital item which has been awarded to the user for the accomplishment of a specified goal or achievement within a video game or even outside of the gaming arena. The digital information contained within the user profile is then displayed (box 420).

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed is:

1. An electronic device for utilizing video game awards, comprising:
    a storage device, the storage device stores a digital gaming object, the digital gaming object was awarded to a game player while the game player played a first video game; and
    one or more processors in communication with the storage device, the one or more processors acquire the digital gaming object from the storage device, the one or more processors execute a second video game in which the digital gaming object is usable within the second video game, the first video game is associated with a first video game title, the second video game is associated with a second video game title different from the first video game title.

2. The electronic device of claim 1, wherein:
the digital gaming object is usable by the game player in both the first video game and the second video game.

3. The electronic device of claim 1, wherein:
the digital gaming object comprises a weapon.

4. The electronic device of claim 1, wherein:
the digital gaming object comprises a jersey.

5. The electronic device of claim 1, wherein:
the first video game is associated with a particular video game title and the second video game is associated with a later version of the particular video game title.

6. A method for utilizing video game awards, comprising:
executing a first video game on a first gaming console, the first gaming console includes one or more processors and a storage device, the executing a first video game on the first gaming console includes executing the first video game using the one or more processors, the first video game awards a digital item other than points to a game player of the first video game;
storing a representation of the digital item in a user profile associated with the game player, the storing a representation of the digital item in a user profile includes storing the representation of the digital item within the storage device; and
executing a second video game, the digital item is usable by the game player within the second video game, the first video game is associated with a first video game title, the second video game is associated with a second video game title different from the first video game title.

7. The method of claim 6, wherein:
the digital item is usable as a gaming object by the game player in both the first video game and the second video game.

8. The method of claim 6, wherein:
the digital item comprises a weapon.

9. The method of claim 6, wherein:
the digital item comprises a jersey.

10. The method of claim 6, wherein:
the digital item provides access to a weapon in the second video game.

11. The method of claim 6, wherein:
the executing a first video game includes awarding the digital item to the game player while the game player is playing the first video game, the digital item is awarded to the game player for an accomplishment in the first video game.

12. The method of claim 6, wherein:
the executing a second video game includes enabling use of the digital item by the game player while the game player is playing the second video game.

13. The method of claim 6, wherein:
the first video game is associated with a particular video game title and the second video game is associated with a later version of the particular video game title.

14. The method of claim 6, wherein:
the storage device includes a nonvolatile memory, the representation of the digital item and the user profile are stored in the nonvolatile memory.

15. The method of claim 6, wherein:
the executing a second video game includes executing the second video game using a second gaming console different from the first gaming console, the first gaming console is in communication with a server, the storing a representation of the digital item in a user profile includes transmitting the representation of the digital item to the server, the server the user profile, the storing a representation of the digital item in a user profile includes storing the representation of the digital item on the server, the server is in communication with the first gaming console and the second gaming console.

16. One or more storage devices containing processor readable code for programming one or more processors to perform a method for utilizing video game awards comprising the steps of:
acquiring a digital gaming object, the digital gaming object was awarded to a game player while the game player played a first video game, the digital gaming object was usable by the game player within the first video game; and
executing a second video game, the digital gaming object is usable by the game player within the second video game, the first video game is associated with a first video game title, the second video game is associated with a second video game title different from the first video game title.

17. The one or more storage devices of claim 16, wherein:
the acquiring a digital gaming object includes acquiring a representation of the digital gaming object from a user profile associated with the game player; and
the executing a second video game includes enabling use of the digital gaming object by the game player while the game player is playing the second video game.

18. The one or more storage devices of claim 16, wherein:
the digital gaming object comprises a weapon.

19. The one or more storage devices of claim 16, wherein:
the digital gaming object comprises a jersey.

20. The one or more storage devices of claim 16, wherein:
the first video game is associated with a particular video game title and the second video game is associated with a later version of the particular video game title; and
the executing a second video game includes executing the second video game using a gaming console.

\* \* \* \* \*